No. 745,690. PATENTED DEC. 1, 1903.
E. J. THOMPSON.
COUPLING FOR SHAFTING.
APPLICATION FILED AUG. 21, 1902.
NO MODEL.
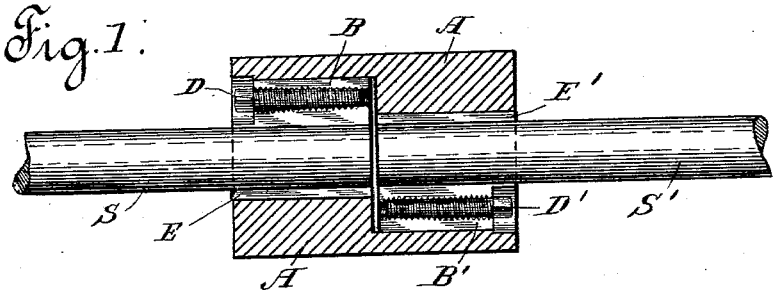
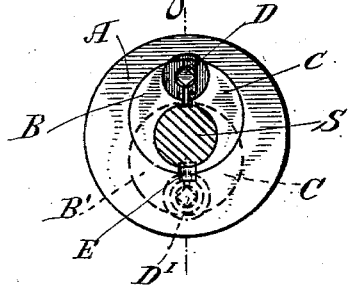
WITNESSES:
INVENTOR
Edward J. Thompson
BY
ATTORNEY No. 745,690. Patented December 1, 1903.

UNITED STATES PATENT OFFICE.

EDWARD J. THOMPSON, OF BENNINGTON, NEW HAMPSHIRE, ASSIGNOR TO CHARLES H. KIMBALL AND FRED H. KIMBALL, OF BENNINGTON, NEW HAMPSHIRE, COPARTNERS DOING BUSINESS AS C. J. KIMBALL COMPANY, A FIRM.

COUPLING FOR SHAFTING.

SPECIFICATION forming part of Letters Patent No. 745,690, dated December 1, 1903.

Application filed August 21, 1902. Serial No. 120,456. (No model.)

*To all whom it may concern:*

Be it known that I, EDWARD J. THOMPSON, of Bennington, in the county of Hillsboro and State of New Hampshire, have invented a certain new and useful Coupling for Shafting, of which the following is a specification.

The object of my invention is to produce a simple, cheap, and efficient coupling, and this object I attain by the means and in the manner hereinafter described, and illustrated in the accompanying drawings, in which—

Figure 1 is a longitudinal section, and Fig. 2 an end view, of my improved coupling, similar letters of reference referring to similar parts in the two figures.

S and S' are the ends of two pieces of shafting which are to be coupled or joined together and which may be of the same or different diameters.

A is a tubular sleeve having a bore eccentric to its axis and larger in diameter than the shafting, and for greater strength the bore is made with its longitudinal center on one side of the axis of the sleeve for half its length and for the other half on the opposite side.

B and C and B' and C' are two pairs of semicylindrical wedges which fit areund the ends of the shafting within the sleeve, each pair of wedges around one piece of the shafting, and are forced around within the sleeve and made to lock the ends of the shafting therein by means of the tapering screws D and D', working, respectively, between the screw-threaded bases of each pair of wedges.

It is desirable that when the shafting is coupled together the axis of each piece and that of the sleeve shall coincide as nearly as possible, and it is obvious how the eccentric bore of the sleeve should be located with relation to its axis and how the semicylindrical wedges should be placed within the sleeve when the parts are assembled to secure the proper adjustment. The keys or splines E and E', seated in longitudinal keyways formed in the inner surface of the sleeve on the line which is nearest to its axis, serve to indicate the line which should separate the edges of the wedges and assure their proper placement within the sleeve. These keys may, if desired, be made high enough so that their inner edges will fit within keyways formed along one side of each piece of shafting, and thereby further increase the efficiency of the coupling.

It will be understood that I do not limit myself to the specific form and arrangement of parts shown and described, since the same may be modified in various ways without departing from the spirit of my invention or sacrificing any of the advantages thereof.

What I claim as new, and desire to secure by Letters Patent, is—

A coupling, consisting of a sleeve with bore eccentric to its axis and to one side thereof for half its length and to the opposite side thereof for the rest of its length, a pair of semicylindrical wedges fitting within each end of the sleeve, a key seated in a keyway formed in each end of the sleeve along the line of the bore which is nearest to the axis, and a tapering screw between the screw-threaded bases of each pair of wedges, substantially as described.

In testimony whereof I have affixed my signature in presence of two witnesses.

EDWARD J. THOMPSON.

Witnesses:
CHAS. H. KIMBALL,
FRED H. KIMBALL.